(12) United States Patent
Butz

(10) Patent No.: US 12,369,706 B2
(45) Date of Patent: Jul. 29, 2025

(54) INTERDENTAL CLEANER

(71) Applicant: Interbros GmbH, Schoenau (DE)

(72) Inventor: Juergen Butz, Utzenfeld (DE)

(73) Assignee: Interbros GmbH, Schoenau (DE)

( * ) Notice: Subject to any disclaimer, the term of this patent is extended or adjusted under 35 U.S.C. 154(b) by 367 days.

(21) Appl. No.: 17/860,406

(22) Filed: Jul. 8, 2022

(65) Prior Publication Data

US 2022/0338614 A1    Oct. 27, 2022

Related U.S. Application Data

(63) Continuation of application No. PCT/EP2020/087931, filed on Dec. 28, 2020.

(30) Foreign Application Priority Data

Jan. 8, 2020 (DE) .................. 10 2020 100 234 .3

(51) Int. Cl.
  *A46B 1/00*    (2006.01)
  *A46B 9/04*    (2006.01)
  *A46B 9/06*    (2006.01)
  *A61C 15/00*   (2006.01)
  *A46B 3/18*    (2006.01)

(52) U.S. Cl.
  CPC ................ *A46B 1/00* (2013.01); *A46B 9/04* (2013.01); *A46B 9/06* (2013.01); *A61C 15/00* (2013.01); *A46B 3/18* (2013.01); *A46B 2200/108* (2013.01)

(58) Field of Classification Search
  CPC .... A46B 1/00; A46B 3/18; A46B 9/04; A61C 15/046
  See application file for complete search history.

(56) References Cited

U.S. PATENT DOCUMENTS

| 5,524,319 | A  | * | 6/1996  | Avidor   | A46B 7/06 |
|           |    |   |         |          | 15/201    |
| 7,836,537 | B1 | * | 11/2010 | Kumar    | A46B 7/06 |
|           |    |   |         |          | 15/201    |
| 9,968,426 | B2 | * | 5/2018  | Butz     | A46D 3/00 |
| 11,259,622| B2 | * | 3/2022  | Butz     | A46B 3/005|
| 2009/0276973 | A1 |   | 11/2009 | Bouix et al. | |

(Continued)

FOREIGN PATENT DOCUMENTS

| DE | 102018008963 A1 * | 5/2020 | ............. A46B 3/005 |
| EP | 2064968 A2 | 6/2009 | |

(Continued)

OTHER PUBLICATIONS

International Search Report dated Mar. 23, 2021 in corresponding application PCT/EP2020/087931.

*Primary Examiner* — Michael D Jennings
(74) *Attorney, Agent, or Firm* — Muncy, Geissler, Olds & Lowe, P.C.

(57) ABSTRACT

An interdental cleaner has a rod-shaped support made of plastics material, which has a cleaning device in an axial end region, which cleaning device has a covering for the support made of a soft-elastic plastics material and a bristle set having a plurality of bristle bundles protruding, with a radial component, from the covering. The bristle bundles extend through the support and are embedded and held therein. The covering has at least one recess on its outer surface, wherein at least one of the bristle bundles is arranged within the recess.

13 Claims, 5 Drawing Sheets

(56) References Cited

U.S. PATENT DOCUMENTS

| | | | | |
|---|---|---|---|---|
| 2010/0024839 A1* | 2/2010 | Kalbfeld | ................ | A61C 15/02 |
| | | | | 132/329 |
| 2011/0225758 A1* | 9/2011 | Chung | .................... | A46D 3/00 |
| | | | | 15/167.1 |
| 2016/0135932 A1* | 5/2016 | Butz | ...................... | A61C 15/00 |
| | | | | 132/329 |
| 2017/0239026 A1* | 8/2017 | Kalbfeld | .............. | A46D 1/0207 |
| 2019/0388201 A1* | 12/2019 | Chen | ................. | A46B 15/0071 |

FOREIGN PATENT DOCUMENTS

| | | | | |
|---|---|---|---|---|
| EP | 2420156 A1 * | 2/2012 | ............. | A46B 3/16 |
| EP | 3120728 A1 | 1/2017 | | |
| JP | 2017124005 A | 7/2017 | | |
| WO | WO2009137259 A2 | 11/2009 | | |
| WO | WO-2012035490 A1 * | 3/2012 | ............. | A46B 5/002 |
| WO | WO-2014023395 A1 * | 2/2014 | ............... | A46B 1/00 |

\* cited by examiner

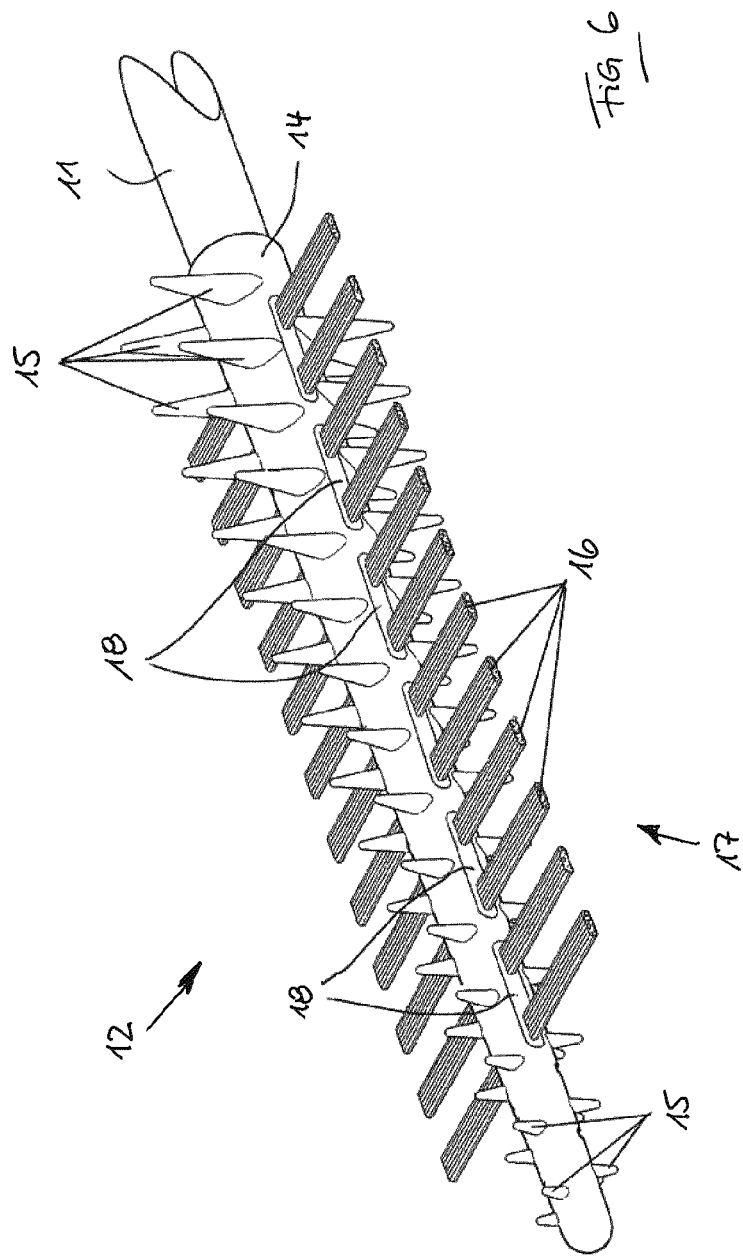

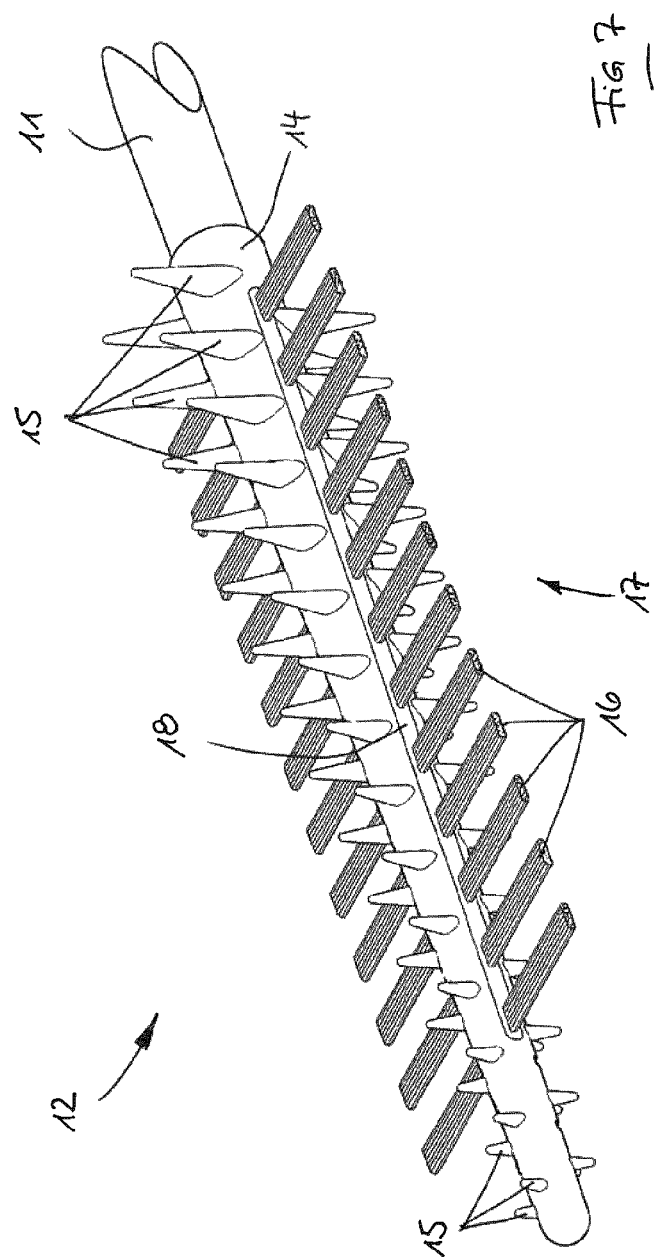

INTERDENTAL CLEANER

This nonprovisional application is a continuation of International Application No. PCT/EP2020/087931, which was filed on Dec. 28, 2020, and which claims priority to German Patent Application No. 10 2020 100 234.3, which was filed in Germany on Jan. 8, 2020, and which are both herein incorporated by reference.

BACKGROUND OF THE INVENTION

Field of the Invention

The present invention relates to an interdental cleaner comprising a rod-shaped support made of plastics material, which has a cleaning device in an axial end region, which cleaning device has a covering for the support made of a soft-elastic plastics material and a bristle set comprising a plurality of bristle bundles protruding, with a radial component, from the covering, the bristle bundles extending through the support and being embedded and held therein.

Description of the Background Art

An interdental cleaner having a corresponding structure is known from WO2014/023395 A1, which corresponds to US 2015/0282601, which is incorporated herein by reference. Such an interdental cleaner has a rod-shaped support made of plastics material, which has a handle part at one end and a cleaning device at its axially opposite end. The cleaning device comprises a sleeve-like covering for the support made of a soft-elastic plastics material, for example a thermoplastic elastomer, which is overmolded onto the support. The covering has structuring on its outside in the form of radially outwardly extending fingers or nubs.

In addition, the cleaning device comprises a bristle set comprising a plurality of bristle bundles protruding, with a radial component, from the covering. The bristle bundles are embedded in the plastics material of the support and held therein.

In this description, the term "axial" denotes a direction substantially along a longitudinal axis of the rod-shaped support and thus of the interdental cleaner, or substantially parallel thereto. The term "radial" denotes a direction extending substantially perpendicularly to the longitudinal axis of the interdental cleaner.

According to the invention, the term "bristle bundle" usually refers to bundles formed of a large number of preferably identical or substantially identical bristles. However, this term should also cover cases where a bristle bundle comprises only a few bristles or even is formed of just one single bristle.

Within the meaning of the invention, bristles can be thin, prefabricated portions of a monofilament or multifilament made of plastics material that have a maximum diameter of 0.25 mm.

In order to produce the interdental cleaner, the bristle bundles are first placed in a cavity of an injection mold and then the plastics material of the support is injected, with the bristle bundles being encapsulated and embedded in the support such that they preferably protrude from the support on opposite sides radially or with a radial component.

In a second method step, the soft-elastic plastics material is then injected onto the support to form the covering and the structuring. For this, it is necessary for the bristle bundles to be sealed so that the soft-elastic plastics material does not escape in the longitudinal direction of the bristle bundles. This sealing is achieved by a clamping force acting on the bristle bundles from the outside. However, here, there is the problem that, although a high clamping force ensures that the bristle bundles are sealed securely, the individual bristles of the bristle bundle are at risk of getting squashed or deformed. If the clamping force is reduced in order to prevent the individual bristles of the bristle bundle from getting damaged, there is a risk of there being insufficient sealing and the soft-elastic plastics material escaping undesirably.

SUMMARY OF THE INVENTION

It is therefore an object of the present invention to provide an interdental cleaner in which the soft-elastic plastics material for forming the covering can be injected without the risk of the plastics material escaping undesirably in the region of the bristle bundles.

According to an exemplary embodiment, the covering can have at least one recess in its outer surface and at least one of the bristle bundles can be arranged within the recess. The recess preferably extends as far as the support.

In an example, a basic concept is not to let the soft-elastic plastics material reach the bristle bundles, but to form a recess in the form of a hole or an opening in the covering and to arrange the bristle bundle or the bristle bundles within the recess. In this way, the bristle bundle is only held within the support and is not embedded in the plastics material of the covering. For injecting the plastics material of the covering, it is thus possible to provide sealing not from the bristle bundle, but from the support. Since the support is usually made of a dimensionally stable, relatively hard plastics material, very effective sealing can be achieved.

The bristle bundle can be arranged at a distance from the edge of the recess, i.e., it does not come into contact with the soft-elastic plastics material that forms the covering. This ensures that there is sufficient space for achieving effective sealing when overmolding the covering.

The recess can be empty, i.e., can form a free space, such that the side wall or the side walls of the recess are formed by the material of the covering and the bottom of the recess is formed by the outer surface of the support.

The recess can also be at least partially and in particular completely filled by a radial extension piece of the support. The extension piece is made of the same plastics material as the support and is connected integrally therewith.

On the radial outer face of the covering, the extension piece can end flush with the outer surface of the covering, but, alternatively, the extension piece of the support can also protrude radially from the recess. In this way, the bristle bundle is embedded in the plastics material of the support over a relatively large area and is therefore held very securely.

The covering can have a plurality of recesses of the type mentioned, it being possible for just one single bristle bundle to be arranged in at least some recesses and preferably in each recess.

Further, a plurality of bristle bundles can be arranged in at least one recess and preferably in each recess, with the bristle bundles preferably being spaced apart from one another in this case.

The bristle bundle or the bristle bundles can be arranged such that the bristle bundle extends through the support and protrudes radially therefrom on opposite sides. The bristle bundle is preferably arranged in a recess on the diametrically opposite sides of said support, i.e., the recesses are preferably formed on diametrically opposite sides of the covering.

At least one of the recesses and preferably a plurality of or even all of the recesses can be linear and can extend in the longitudinal direction of the support. The term "linear" can mean that the recess extends substantially in a straight line in the longitudinal direction of the support, but, alternatively, the elongate recess can also be bent, i.e., have a discontinuous course or extend helically around the support.

The cleaning device can additionally have a plurality of fingers, nubs or fins protruding, with a radial component, from the covering, which can be formed integrally with the covering and are made of the same soft-elastic material as said covering.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 shows a front end of the interdental cleaner according to an example, and FIG. 7 shows a front end of an interdental cleaner according to an example.

DETAILED DESCRIPTION

Figure 1:
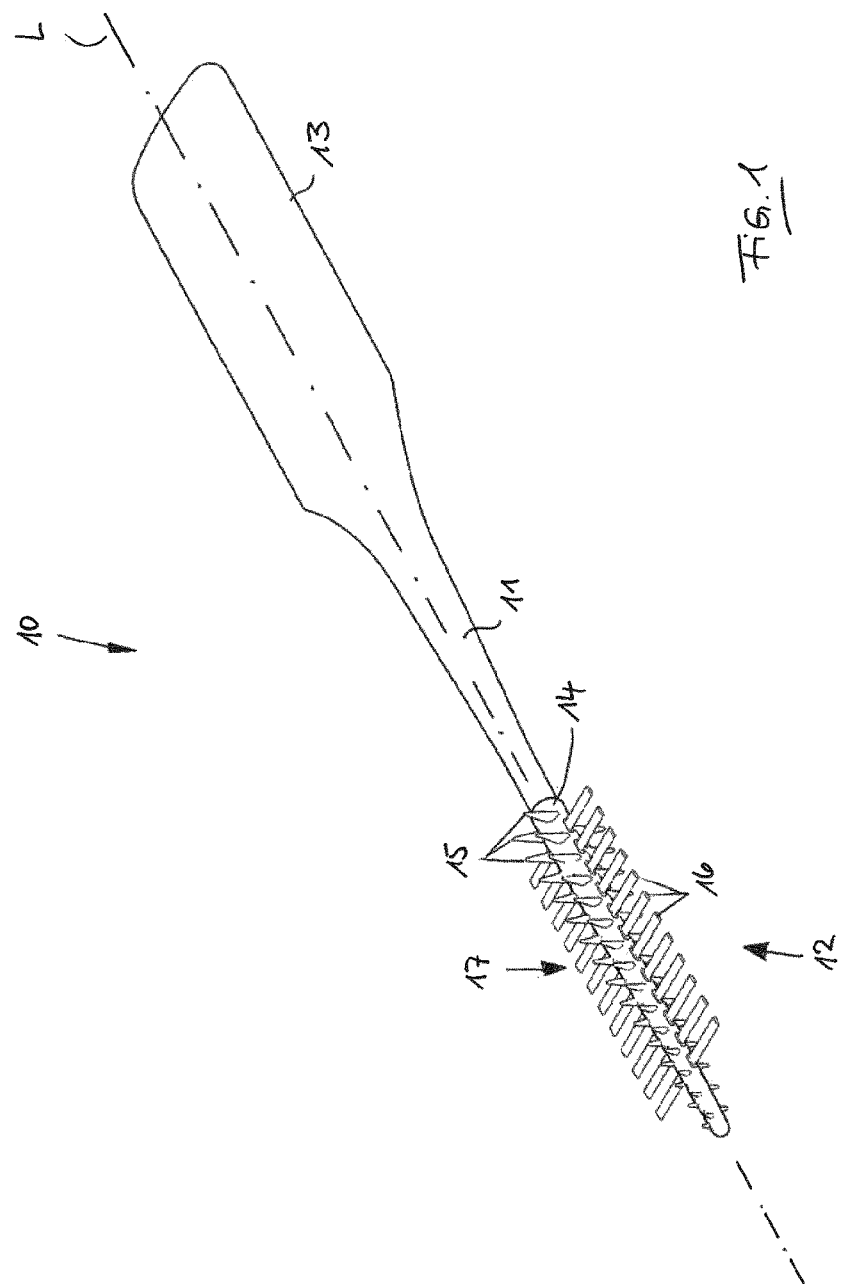
FIG. 1 is a perspective view of an interdental cleaner according to an example.
Figure 2:
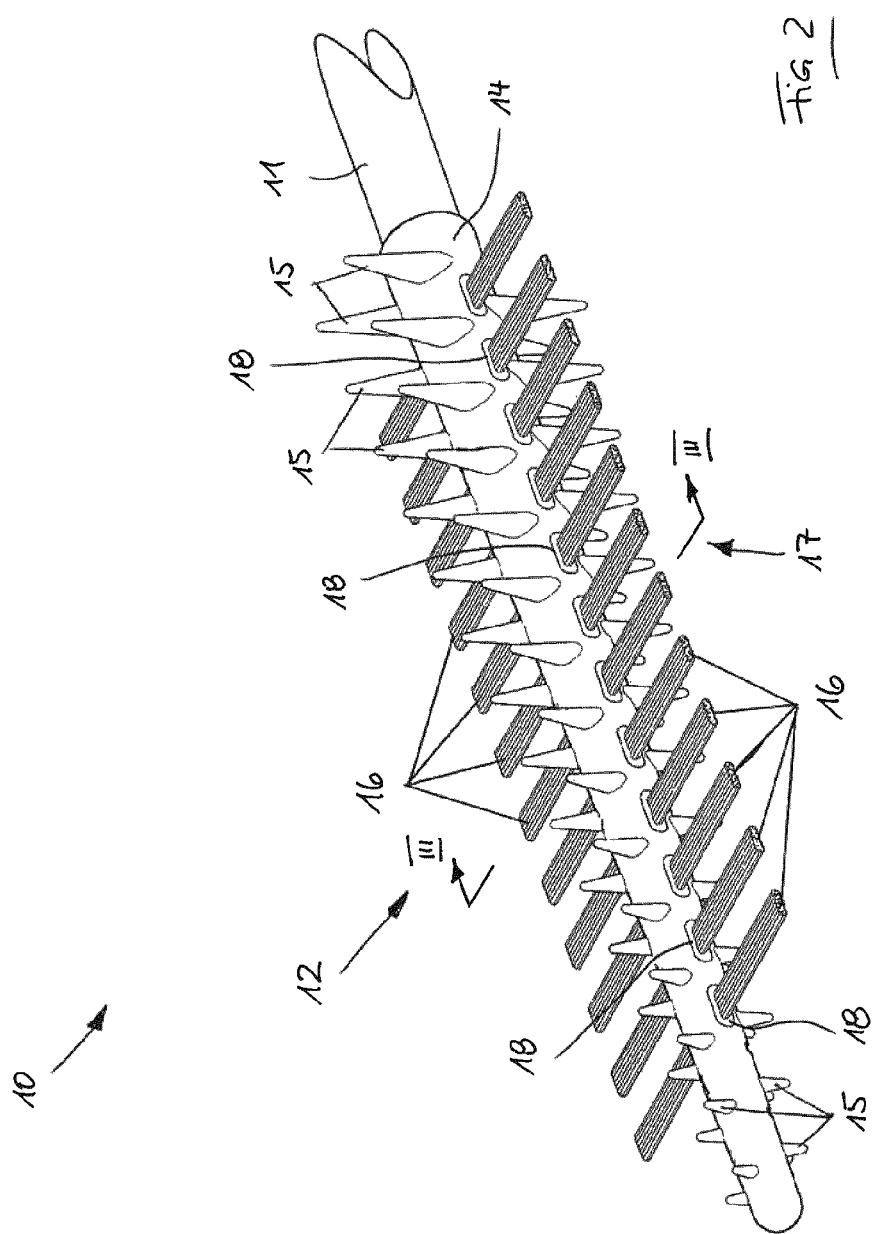
FIG. 2 is an enlarged view of the front end of the interdental cleaner according to FIG. 1.

FIGS. 1 and 2 are each a perspective view of an interdental cleaner 10 which has a rod-shaped support 11 made of plastics material. A handle portion 13 is formed on the rear end of the rod-shaped support 11, which end is on the right as shown in FIG. 1, by which handle portion a user can grip the interdental cleaner 10. A cleaning device 12 is attached to the rod-shaped support 11 at the front end axially opposite the handle portion 13, which end is on the left as shown in FIG. 1. The cleaning device 12 has a sleeve-like covering 14 for the support 11 and a bristle set 17. The covering 14 is made of a soft-elastic plastics material and is overmolded onto the support. The bristle set 17 is formed of a large number of bristle bundles 16 which, in the embodiment shown, extend radially to a longitudinal axis L of the support 11 and are all arranged next to one another in parallel at a distance from one another. However, other orientations and mutual arrangements of the bristle bundles are also possible.

Each bristle bundle extends through the support 11 and is embedded in the material of the support 11 and held therein. In addition, each bristle bundle 16 protrudes radially from the support 11 on diametrically opposite sides thereof.

A plurality of radially outwardly protruding and freely projecting fingers 15 are formed on the outside of the covering 14, which fingers are made of the same material as the covering 14 and are formed integrally therewith. The fingers 15 are in the shape of a radially outwardly tapering cone.

Figure 3:
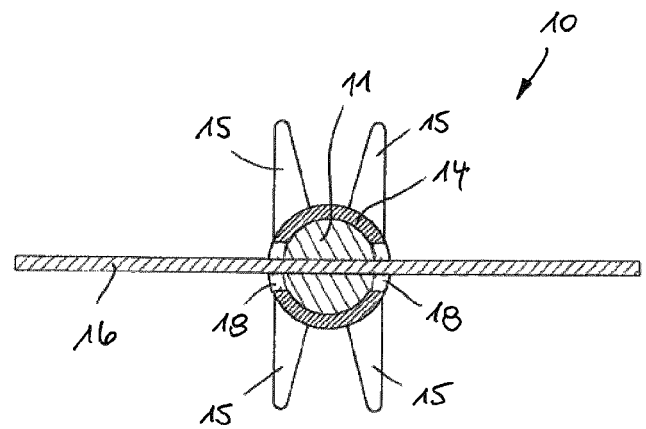
FIG. 3 is the section III-III from FIG. 2.

As shown in particular in FIGS. 2 and 3, a plurality of recesses 18 are formed in the covering 14, which each extend in the radial direction as far as the support 11 and thus form a free space in the form of a hole in the covering 14.

As FIG. 3 shows, each bristle bundle 16 is assigned two corresponding recesses 18 in diametrically opposite sides of the support 11 and covering 14. The bristle bundle 16 extends through the recesses 18 and the support 11 without touching the covering 14, i.e., the bristle bundle 16 is arranged at a distance from the edge of the recess 18.

In the example shown in FIG. 2, each bristle bundle 16 is assigned two diametrically opposite recesses 18, i.e., only one bristle bundle 16 is arranged in each recess 18.

Figure 4:
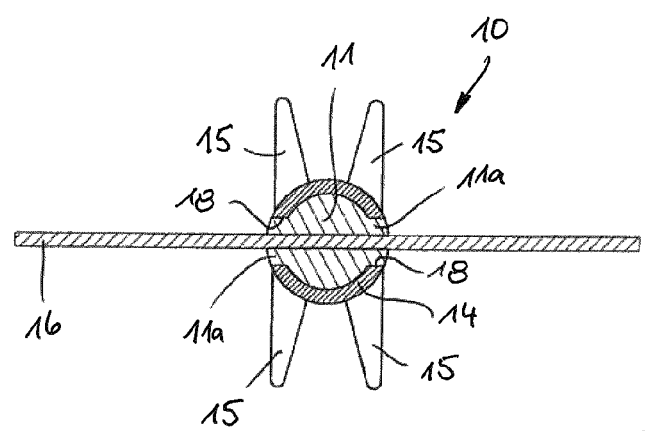
FIG. 4 shows a first modification of the example according to FIG. 3.

In the example according to FIG. 3, the recess 18 forms a free space in the covering 14. In a development of this embodiment, according to FIG. 4, radial extension pieces 11a are formed on the support 11 which each completely fill a recess 18. The outer surface of the extension pieces 11a smoothly and continuously transitions into the outer surface of the covering 14, as shown in FIG. 4. This results in a greater clamping length of the bristle bundle 16 in the support 11 and thus better retention of the bristle bundle 16.

Figure 5:
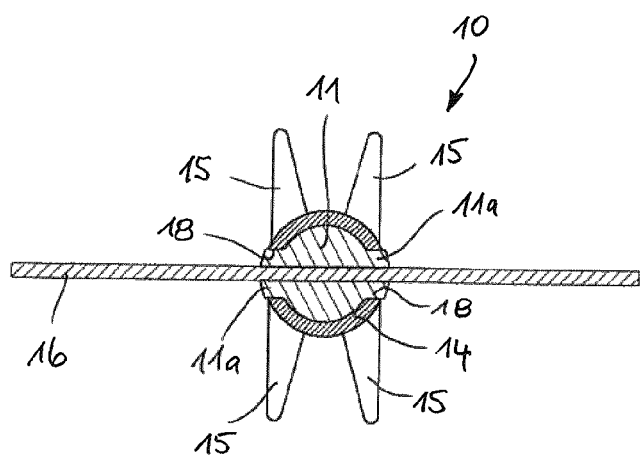
FIG. 5 shows a second modification of the example according to FIG. 3.

In the example shown in FIG. 5, the extension piece 11a of the support 11 not only fills the recess 18 in the covering 14, but also even protrudes radially from the recess 18. In this way, the clamping length of the bristle bundle 16 in the material of the support 11 can be increased even further.

In the example shown in FIG. 2, just one single bristle bundle 16 is arranged in each recess 18. FIG. 6 shows an embodiment in which each recess 18 has an elongate shape extending in the longitudinal direction of the support 11, with two bristle bundles 16 being arranged in each recess 18 spaced apart from one another.

FIG. 7 shows an example according to FIG. 6 in which only two linear recesses 18 arranged on diametrically opposite sides of the covering 14 are formed, which recesses extend in a straight line in the longitudinal direction of the support 11. All bristle bundles 16 are arranged in the two linear recesses 18 at a distance from one another and at a distance from the edge of the recesses 18.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An interdental cleaner comprising:
a rod-shaped support made of a plastic material;
a cleaning device arranged in an axial end region of the rod-shaped support, the cleaning device comprising a covering for the rod-shaped support, the covering made of a soft-elastic plastics material and a bristle set comprising at least two bristle bundles protruding radially from the covering, the at least two bristle bundles extending through the support and being embedded and held therein; and
at least one recess formed in an outer surface of the covering, wherein at least one bristle bundle of the at least two bristle bundles is arranged within the at least one recess, and wherein the at least one bristle bundle is arranged at a distance from an edge of the at least one recess, such that the at least one bristle bundle does not touch the covering.

2. The interdental cleaner according to claim 1, wherein the at least one recess is a hole that extends through the cleaning device to the support.

3. The interdental cleaner according to claim 1, wherein the at least one recess forms a free space.

4. The interdental cleaner according to claim 1, wherein the at least one recess is at least partially filled by an extension piece of the support.

5. The interdental cleaner according to claim 4, wherein the extension piece of the support protrudes radially from the at least one recess.

6. The interdental cleaner according to claim 1, wherein the at least one recess includes a plurality of recesses.

7. The interdental cleaner according to claim 6, wherein the plurality of recesses are arranged on diametrically opposite sides of the covering.

8. The interdental cleaner according to claim 1, wherein only one respective bristle bundle is arranged in each respective recess.

9. The interdental cleaner according to claim 1, wherein a plurality of bristle bundles spaced apart from one another are arranged in each respective recess.

10. The interdental cleaner according to claim 1, wherein the at least one recess is linear and extends in a longitudinal direction of the support.

11. The interdental cleaner according to claim 1, wherein the covering has a plurality of fingers and/or nubs and/or fins protruding radially from the covering.

12. The interdental cleaner according to claim 11, wherein the plurality of fingers and/or nubs and/or fins are formed integrally with the covering.

13. The interdental cleaner according to claim 1, wherein bristles of the at least one bristle bundle touch the plastic material of the support.

* * * * *